US012434157B2

(12) United States Patent
Shriki et al.

(10) Patent No.: US 12,434,157 B2
(45) Date of Patent: Oct. 7, 2025

(54) GAMING SYSTEM ACCOMPANIED BY VIDEO CHAT AND METHOD OF PERFORMING GAMING SESSION

(71) Applicant: COMUNIX LTD., Tel Aviv (IL)

(72) Inventors: Idan Shriki, Tel Aviv (IL); Or Haim Ben-Shimon, Tel Aviv (IL)

(73) Assignee: COMUNIX LTD., Tel Aviv (IL)

( * ) Notice: Subject to any disclaimer, the term of this patent is extended or adjusted under 35 U.S.C. 154(b) by 361 days.

(21) Appl. No.: 18/016,519

(22) PCT Filed: Jul. 19, 2021

(86) PCT No.: PCT/IL2021/050881
§ 371 (c)(1),
(2) Date: Jan. 17, 2023

(87) PCT Pub. No.: WO2022/018725
PCT Pub. Date: Jan. 27, 2022

(65) Prior Publication Data
US 2023/0271092 A1 Aug. 31, 2023

Related U.S. Application Data

(60) Provisional application No. 63/053,871, filed on Jul. 20, 2020.

(51) Int. Cl.
*A63F 13/87* (2014.01)
*A63F 13/35* (2014.01)
(Continued)

(52) U.S. Cl.
CPC .............. *A63F 13/87* (2014.09); *A63F 13/35* (2014.09); *A63F 13/55* (2014.09); *A63F 13/655* (2014.09)

(58) Field of Classification Search
CPC .......... A63F 13/87; A63F 13/35; A63F 13/55; A63F 13/655; A63F 13/795; A63F 13/86; A63F 2300/5553
(Continued)

(56) References Cited

U.S. PATENT DOCUMENTS 6,755,741 B1 6/2004 Rafaeli
7,695,366 B1 * 4/2010 Holch ..................... G07F 17/32 463/25
(Continued)

FOREIGN PATENT DOCUMENTS

EP 3207968 A1 8/2017

OTHER PUBLICATIONS

Critical Gambling Studies (2020), vol. 1(1). Fiona Nicoll (Editor) & Murat Akcayir (Guest Co-Editor). Published Apr. 9, 2020; Available online at: https://criticalgamblingstudies.com/index.php/cgs/issue/view/7.

(Continued)

*Primary Examiner* — Michael A Cuff
(74) *Attorney, Agent, or Firm* — The Roy Gross Law Firm, LLC; Roy D. Gross

(57) ABSTRACT

A gaming system accompanied by a video chat (a) a gaming server configured for performing a gaming session further comprising receiving actions, executing the gaming session and generating game results; and (b) a video chat server configured for establishing and maintaining a video chat between game players; and (c) at least two gaming end terminals usable by an individual game player; the game end terminal connectable to the gaming and video chat servers. The gaming end terminal configured for representing the video chat image, inputting and outputting game data; the user end terminal comprising: (i) a gaming thread further comprising a user interface; and (ii) video chat thread. The
(Continued)

gaming thread comprises a library of graphical objects, the graphical objects correspond to game statuses of the game player associated with the game results generated by the gaming server and representable by the user interface.

7 Claims, 2 Drawing Sheets

(51) Int. Cl.
*A63F 13/55* (2014.01)
*A63F 13/655* (2014.01)

(58) Field of Classification Search
USPC .......................................................... 463/40
See application file for complete search history.

(56) References Cited

U.S. PATENT DOCUMENTS

| | | | |
|---|---|---|---|
| 9,092,933 | B2 | 7/2015 | Arnone et al. |
| 11,465,060 | B2 * | 10/2022 | Chandrasekaran ..... A63F 13/35 |
| 2009/0111572 | A1 * | 4/2009 | Bigelow, Jr. ........ G07F 17/3267 463/40 |
| 2013/0244778 | A1 | 9/2013 | Barclay et al. |
| 2014/0121015 | A1 | 5/2014 | Massing et al. |
| 2019/0213829 | A1 | 7/2019 | Nguyen |

OTHER PUBLICATIONS

PCT International Search Report for International Application No. PCT/IL2021/050881, mailed Nov. 10, 2021, 4pp.
PCT Written Opinion for International Application No. PCT/IL2021/050881, mailed Nov. 10, 2021, 4pp.

* cited by examiner

GAMING SYSTEM ACCOMPANIED BY VIDEO CHAT AND METHOD OF PERFORMING GAMING SESSION

CROSS REFERENCE TO RELATED APPLICATIONS

This application is a National Phase of PCT Patent Application No. PCT/IL2021/050881 having International filing date of Jul. 19, 2021, which claims the benefit of priority of U.S. Provisional Patent Application No. 63/053,871, filed Jul. 20, 2020 the contents of which are all incorporated herein by reference in their entirety.

FIELD OF THE INVENTION

The present invention relates to gambling game systems and methods, and particularly to such systems and methods enhancing a psychic impact of a gambling game on a game player.

BACKGROUND OF THE INVENTION

Gambling games have existed since antiquity. Most of these games are based heavily on chance. Some, such as slot machines, are based entirely on chance. The others, such as blackjack and craps, require some skill for "success", where "success" is of course measured against an inherent house advantage. Games of pure or primarily skill have not previously been successfully used in casinos because the skill element can overwhelm the inherent house advantage, thus making such games unprofitable.

Games of skill, however, can be highly attractive to players who enjoy the possibility of using their skills and wits to overcome odds against them.

With the increasing use of IT infrastructure by private individuals and the increasing use of the internet communication network, many gambling game systems have been developed and are now in use enabling remotely-located players to play gambling games via the internet. The presently-available systems are virtual systems which display a simulated or virtual game device, such as a roulette wheel, card table, or slot machine, on which the player may place a bet at the player station. A data processor system "automatically" credits the player for the "wins" and debits the player for the "losses" according to the specific game choice.

U.S. Pat. No. 6,755,741 discloses a gambling game system is disclosed, comprising a central station including a plurality of betting-type game devices, and an electronic camera for each game device. A plurality of player stations remotely located with respect to the central stations, each one including a monitor for displaying a selected game device at the central station, and input means for selecting a game device and for placing a bet by a player at the player's station relating to an action involving an element of change to occur at the selected game device.

U.S. Pat. No. 9,092,933 discloses systems and methods for configuring a gaming system. In one such gaming system, a plurality of real-world engine modules are provided for a hybrid game, each real world engine module having a gambling game that is triggered by an element of an entertainment game of the hybrid game. A selection is received, from a player of the hybrid game, of a selected real world engine module of the plurality of real world engine modules, and triggering is enabled of the selected real world engine module's gambling game by the element of the entertainment game of the hybrid game.

The impact of gambling (Eger M, Critical Gambling Studies (2020), vol. 1, No. 1, pp. 12-22) on the human psychic system is an example of systemic interaction that considers the gambling experience of the individual. From the perspective of a gambling system, the emotions sparked by a loss constitute a part of the environment that is processed through communication. An emotional reaction to a loss can result in what is called tilting (making detrimental decisions). From a systems theoretical perspective, this emotional reaction and possible tilting needs to be processed and re-integrated into the gambling system. In a way, tilting is already integrated into the gambling system since a poker player continues to stake often disproportionally high amounts to continue gambling, but an impassive reaction is also a way to continue and reproduce the gambling system. A player's competence not only as a player but in remaining in control becomes the stake in the gambling system. There are indications of inability of the psychic system to process gambling-induced complexity—such as the mechanisms of chance, whether they be 'pure' or tilted by the gambling industry to engage the player to continue gambling. It might provide an explanation to why gamblers continue to chase losses or believe in near misses.

It is known in the art that multimedia means can enhance an impact of gambling on the player. Thus, there is a long-felt and unmet means of providing a gambling game system configured for representing a graphic (for example, and animated object in the field of view of a player in order to intensify the psychic impact of the game.

SUMMARY OF THE INVENTION

It is hence one object of the invention to disclose a gaming system accompanied by a video chat. The aforesaid system comprises: (a) a gaming server configured for performing a gaming session further comprising receiving actions, executing said gaming session and generating game results; and (b) a video chat server configured for establishing and maintaining a video chat between game players; and (c) at least two gaming end terminals usable by an individual game player; said gaming end terminal connectable to said gaming and video chat servers; said gaming end terminal configured for representing said video chat image, inputting and outputting game data; said gaming end terminal comprising: (i) a gaming thread further comprising a user interface; and (ii) a video chat thread.

It is a core purpose of the present invention to provide the gaming thread comprising a library of graphical objects. The graphical objects correspond to game statuses of said game player associated with said game results generated by said gaming server and representable by said user interface. The graphical object are selectable by said gaming thread from said library in accordance to a current game status of said game player and representable said graphical object by said user interface.

Another object of the present invention to provide the gaming end terminal selected from the group consisting of: a smartphone, a tablet computer, a laptop computer, a desktop computer, a personal digital assistant, a videogame console, a television-game device and any combination thereof.

A further object of the present invention to provide the game statuses selected from the group consisting of a win, a loss and a draw.

A further object of the present invention to provide the gaming end terminal connectable to said application server by means of a local area network, a wide area network, a wireless local area network and any combination thereof.

A further object of the present invention to provide the graphical object selected from the group consisting of a static graphic object, a photograph of a static real-world object, an animated graphic object, a video of a moving real-world object and any combination thereof.

A further object of the present invention to provide a method of performing a gaming session. The aforesaid method comprises steps of: (a) providing a gaming system accompanied by a video chat; said gaming system comprises: (i) a gaming server configured for performing a gaming session further comprising receiving actions, executing said gaming session and generating game results; (ii) a video chat server configured for establishing and maintaining a video chat between game players; and (iii) at least two gaming end terminals usable by an individual game player; said gaming end terminal connectable to said gaming and video chat servers; said gaming end terminal configured for representing said video chat image, inputting and outputting game data; said gaming end terminal comprising: (1) a gaming thread further comprising a user interface; and (2) a video chat thread; said gaming thread comprises a library of graphical objects; said graphical objects correspond to game statuses of said game player associated with said game results generated by said gaming server and representable by said user interface; said graphical object from are selectable by said gaming thread from said library in accordance to a current game status of said game player and representable said graphical object by said user interface; (b) establishing a video chat connection of at least one user to said video chat server; (c) representing said video chat on user interfaces of said gaming end terminal; (d) receiving actions by said gaming server; (e) executing said game by said gaming server; (f) generating game results by said gaming server; (g) assigning a game status to said game results generated by said gaming server; (h) sending said game status data to said gaming end terminal; (i) selecting said graphic object corresponding to said game status from said library in response to receiving thereof by; and (j) representing said graphic object on said user interface to at least one game player.

A further object of the present invention to provide the steps a to j performable in any order to each other in parallel or sequentially.

BRIEF DESCRIPTION OF THE DRAWINGS

In order to understand the invention and to see how it may be implemented in practice, a plurality of embodiments is adapted to now be described, by way of non-limiting example only, with reference to the accompanying drawings, in which.

DETAILED DESCRIPTION OF THE INVENTION

The following description is provided, so as to enable any person skilled in the art to make use of said invention and sets forth the best modes contemplated by the inventor of carrying out this invention. Various modifications, however, are adapted to remain apparent to those skilled in the art, since the generic principles of the present invention have been defined specifically to provide a gaming system accompanied by a video chat and a method of using the same.

The term "video chat" hereinafter refers a face-to-face conversation of game players in real time or broadcasted with any delay over the Internet by means of a webcam or video cameras built into a gaming terminal and special software.

The term "gaming session" hereinafter refers wagering a virtual value on an event with an uncertain outcome, with the primary intent of the aforesaid virtual value. The gaming session thus requires three elements to be present: consideration (an amount wagered), risk and/or action, and a virtual prize.

Figure 1:
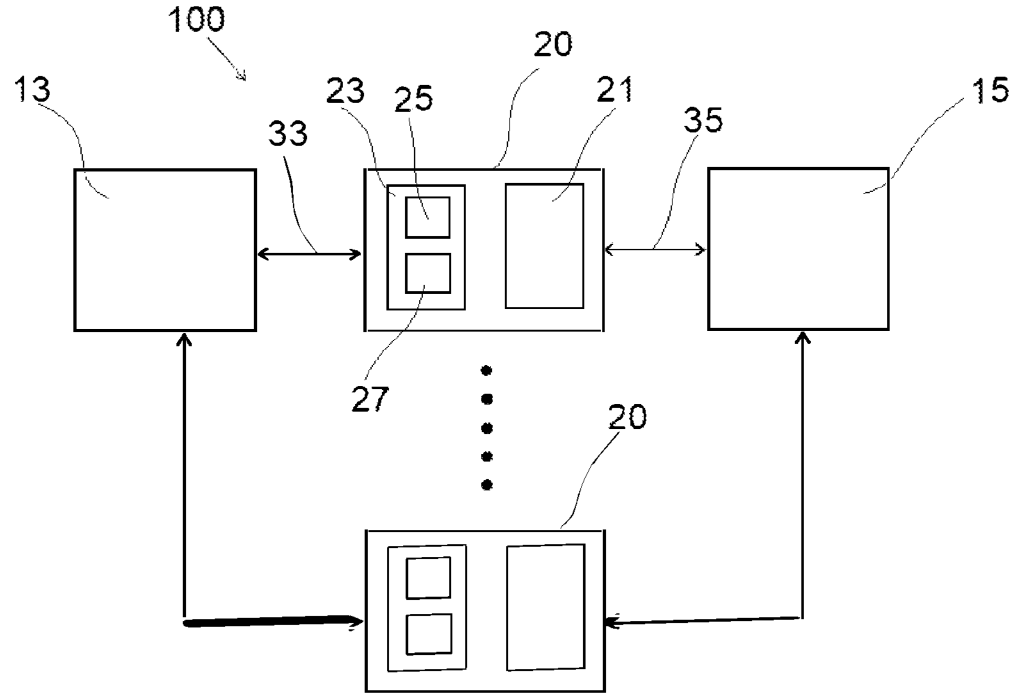
FIG. 1 is a block diagram of a gambling game system.

Reference is now made to FIG. 1 presenting a block diagram of gaming system 100. The abovementioned system is based on two servers 13 and 15 being in communication with at least two game end terminals 20. Gaming server 13 is configured for implementing the following: receiving players' actions, executing the gaming game and generating results of the game. Video chat sever 15 establishes and maintains a video chat between game players who contact to each other via game end terminals 20 which is selected from the group consisting of a smartphone, a tablet computer, a laptop computer, a desktop computer, a personal digital assistant, a videogame console and a television-game device. Game end terminals 20 comprises video user thread 21 and gaming thread 23 further comprising user interface 25 and library 27 of graphical objects. It should be emphasized that the graphical objects can be selected from the group consisting of a static graphic object, a photograph of a static real-world object, an animated graphic object and a video of a moving real-world object. Static and dynamic images of gestures and facial expressions are also are in the scope of the present invention. Game end terminals 20 are connected to servers 13 and 15 by means of network segments indicated by numerals 33 and 35 such as a local area network, a wide area network, a wireless local area network. Library 23 is configured for storing animated objects assigned to specific game statuses generated by gaming server 13. The assigned animated objects are represented by user interface 25 in response to receiving corresponding game statuses generated by gaming module 13. The video chat video generated by server 15 is concurrently represented on user interface 25 with selected assigned animated objects in a real-time manner. The aforesaid statuses can be selected from the following: a win, a loss and a draw.

Figure 2:
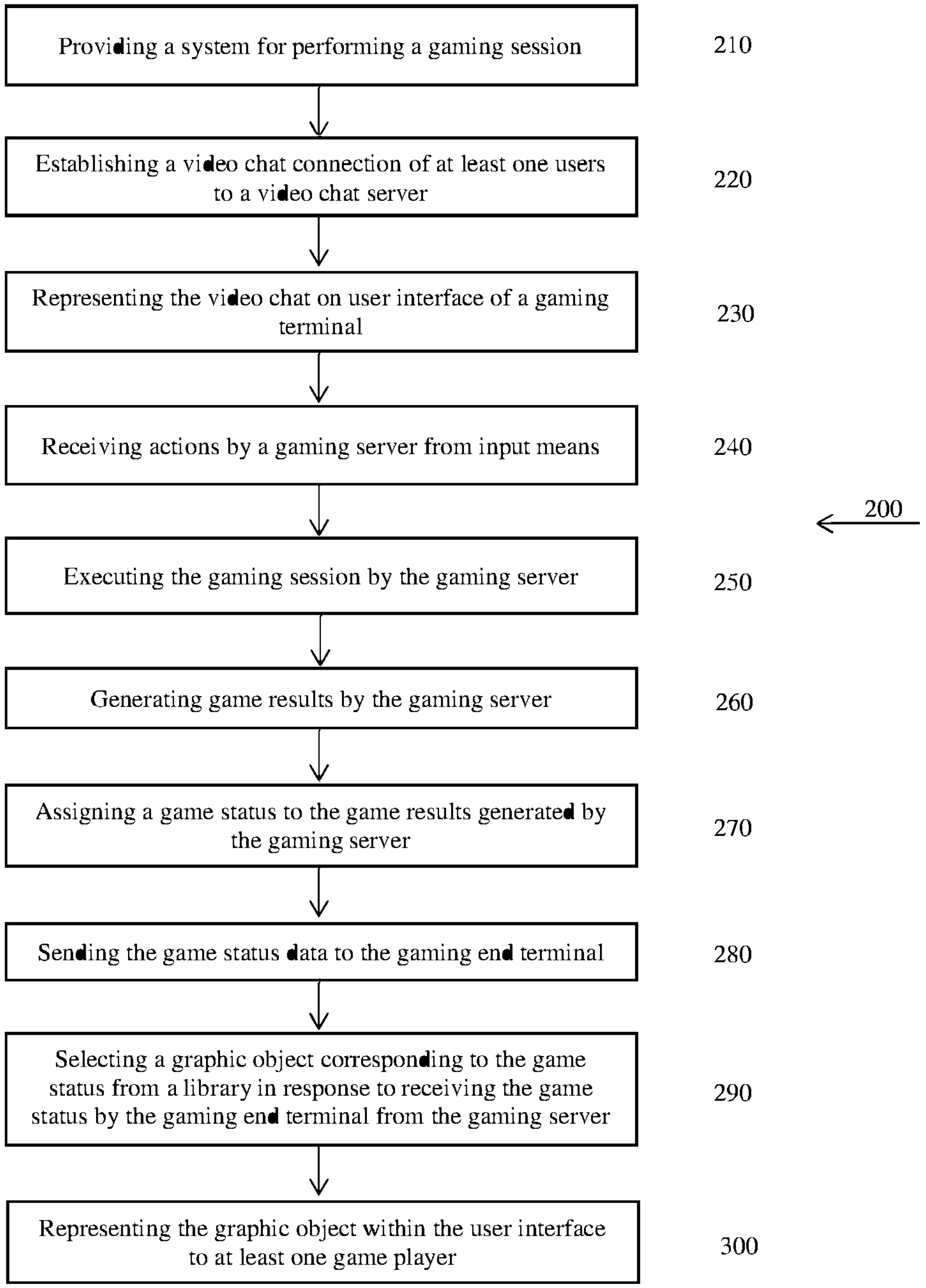
FIG. 2 is a flowchart diagram of a method of performing a gambling game session.

Reference is now made to FIG. 2 presenting method 200 of performing a gaming session. Method 200 starts from step 210 of providing a system for performing a gaming session. Game players via establish a video chat connection via the video chat server (step 220). Video chat stream is represented on user interface of gaming end terminals of game players (step 230). The game player can submit their actions via the gaming end terminal. The aforesaid actions are received by the gaming server (step 240). After that, a gaming session is executed (step 250) which results in generating game results (step 260). The gaming server is configured for assigning a specific game status such as a win, a loss and a draw to each game result related to an individual game player (step 270). The obtained game statuses are sent to the game end terminals (step 280). As mentioned above, each gaming end terminal is provided with a library including a plurality of animated objects predeterminedly attributed to the aforesaid game statuses. The gaming end terminal is configured for selecting an animated object corresponding to the current game status from a library in response to receiving the game status by the gaming end terminal from the gaming server (step 290). The selected graphical object is represented within the chat video stream to at least one game player (step 300). Shared and private representations of the graphical objects corresponding to the current game statuses the gaming end terminals are in the scope of the present invention.

Those skilled in the art to which this invention pertains will readily appreciate that numerous changes, variations and modifications can be effectuated without departing from the true spirit and scope of the invention as defined in and by the appended claims.

The invention claimed is:

1. A gaming system accompanied by a video chat, comprising:

a. a gaming server configured for performing a gaming session comprising receiving player actions, executing the gaming session, and generating game results;

b. a video chat server configured for establishing and maintaining a video chat between game players; and c. at least two gaming end terminals, each usable by an individual game player and connectable to the gaming and video chat servers, each gaming end terminal configured for representing a video chat image, inputting and outputting game data, and comprising:

i. a gaming thread comprising a user interface; and ii. a video chat thread;

wherein the gaming thread comprises a library of graphical objects corresponding to game statuses of the game player associated with the game results generated by the gaming server, and wherein the graphical objects are selectively displayed within the video chat thread in real-time to reflect the current game status of the game player during the video chat session.

2. The gaming system of claim 1, wherein the gaming end terminal is selected from the group consisting of a smartphone, a tablet computer, a laptop computer, a desktop computer, a personal digital assistant, a videogame console, a television-game device, and any combination thereof.

3. The gaming system of claim 1, wherein the game statuses represented by the graphical objects are selected from the group consisting of a win, a loss, and a draw, and wherein the graphical objects representing said win, loss, or draw are visually distinguishable within the video chat thread.

4. The gaming system of claim 1, wherein the gaming end terminal connectable to the application server by means of a local area network, a wide area network, a wireless local area network, and any combination thereof.

5. The gaming system of claim 1, wherein the graphical object is selected from the group consisting of a static graphic object, a photograph of a static real-world object, an animated graphic object, a video of a moving real-world object, and any combination thereof.

6. A gaming method accompanied by a video chat, comprising:

a. performing, by a gaming server, a gaming session comprising receiving player actions, executing the gaming session, and generating game results;

b. establishing and maintaining, by a video chat server, a video chat between game players; and c. enabling at least two gaming end terminals, each usable by an individual game player and connectable to the gaming and video chat servers, each gaming end terminal configured for representing a video chat image, inputting and outputting game data, and comprising:

i. a gaming thread comprising a user interface; and ii. a video chat thread;

wherein the gaming thread comprises a library of graphical corresponding to game statuses of said game player associated with said game results generated by the gaming server, and wherein the graphical objects are selectively displayed within the video chat thread in real-time to reflect the current game status of the game player during the video chat session.

7. The method of claim 6, wherein the steps are performable in any order to each other in parallel or sequentially.

* * * * *